| United States Patent [19] | [11] Patent Number: 4,829,132 |
| Umemoto et al. | [45] Date of Patent: May 9, 1989 |

[54] RESINOUS COMPOSITION CONTAINING POLYESTER RESIN, FOR COATING USE

[75] Inventors: Hirotoshi Umemoto, Uji; Hisaki Tanabe, Yawata; Shinji Nakano, Takatsuki, all of Japan

[73] Assignee: Nippon Paint Co., Ltd., Osaka, Japan

[21] Appl. No.: 88,531

[22] PCT Filed: Sep. 2, 1983

[86] PCT No.: PCT/JP83/00294

§ 371 Date: May 2, 1984

§ 102(e) Date: May 2, 1984

[87] PCT Pub. No.: WO84/00972

PCT Pub. Date: Mar. 15, 1984

Related U.S. Application Data

[63] Continuation-in-part of Ser. No. 782,613, Oct. 1, 1985, abandoned, which is a continuation of Ser. No. 608,694, May 2, 1984, abandoned.

[30] Foreign Application Priority Data

Sep. 6, 1982 [JP] Japan ................................. 57-155632

[51] Int. Cl.⁴ ............................................. C08L 67/02

[52] U.S. Cl. .................................... 525/443; 528/302; 528/307

[58] Field of Search ................. 525/443; 528/302, 307

[56] References Cited

U.S. PATENT DOCUMENTS

3,691,258 9/1972 Riemhofer .......................... 525/443
4,204,014 5/1980 Dorffel ................................ 525/443

Primary Examiner—Patricia Short
Attorney, Agent, or Firm—Wenderoth, Lind, & Ponack

[57] ABSTRACT

Resinous composition for use in coating comprising a hexahydrophthalic acid or anhydride thereof whose acidic groups are capable of developing a resinous acid value and etherified aminoformaldehyde resin. This resinous composition is characterized by possessing all the advantages of oil-free polyester resin compositions such as good weather resistance mechanical properties in the coating, interlaminar adhesion and the like, and furthermore the composition inter alia, has excellent weather resistance because of its modification with saturated alicyclic acids and the curing properties are enhanced because of the control of the acidic groups which develops a resinous acid value. The invention also provides a coating composition, containing as a vehicle, the aforementioned resinous composition.

4 Claims, 1 Drawing Sheet

RESINOUS COMPOSITION CONTAINING POLYESTER RESIN, FOR COATING USE

This application is a continuation-in-part of application Ser. No. 782,613 filed Oct. 1, 1985, which is a continuation of application Ser. No. 608,694, filed May 2, 1984, both applications being now abandoned.

FIELD OF THE INVENTION

The present invention relates to resinous composition for coating use and more specifically a coating composition which is useful as a top coat for automobile bodies and the like and is excellent in weather resistance, mechanical properties of the film, interlaminar adhesion and particularly in the curability thereof.

BACKGROUND OF THE INVENTION

Recently, as a top coat for automobile bodies and the like, has been welcomed a coating composition which is excellent in weather resistance, mechanical properties of the film, and interlaminar adhesion and oil-free polyester/amino aldehyde reinous system is now receiving increased attention. However, this type of coating composition is apt to result, in considerable cising and hence is difficult to make produce a uniform coating, since a coating having an inferior glossy surface is formed which shows poor compatibility with the amino resin, and for these reasons, it is difficult to apply such coatings to automobile bodies and the like. Under the circumstances, as an attempt of overcoming the defect possessed by heretofore known oil-free polyester-/amino resins coating compositions, as mentioned above, while maintaining the advantages thereof, a proposal has been made to use a larger quantity of a saturated alicyclic polycarboxylic acid or a combination of an aromatic polycarboxylic acid and a saturated alicyclic polycarboxylic acid as an acid component of a oil free polyester resin (Japanese Patent Application Kokai No. 20068/81). The use of such saturated alicyclic acid modified polyester resin (hereinafter merely called a modified polyester resin), however, serves only to some extent to improve the occurence of cissing, dim gloss and poor compatibility with said amino resin, and therefore, it is difficult to overcome the aforementioned shortcomings. Moreover, a new problem of insufficient curing occurs due to the modification with said saturated alicyclic acid, making it very difficult to put the resin in practical use. Therefore, an object of the present invention is to provide a coating composition which retains the excellent qualities of a known oil-free polyester/amino resin system, but which is free from the defects of insufficient curing inevitably produced by the use of such modified polyester resin, but which still exhibits excellent gloss and weather resistance properties. According to the studies of the present inventors, it has been found that the employment of saturated alicyclic polycarboxylic acid as a part of said acid component of polyester resin is indeed very effective for improving the weather resistance of the coating, but when the resin is mixed with a melamine resin and a cured film formed, it will cause the problem of reduced initial gloss and inferior curing and the inclusion of an aromatic polycarboxylic acid component is indeed of advantage in obtaining a film with improved gloss and curing properties, however, barely results in a film having advanced weather resistance. The inventors also have found that even if both a saturated alicyclic polycarboxyl acid and an aromatic polycarboxylic acid are used together for the purpose of obtaining a resinous film with excellent weather resistance, gloss and curing properties, this cannot always be achieved. This is because the reactivity of the saturated alicylic acid is rather poor, the aromatic polycarboxylic acid is more quickly incorporated into the polyester chain and the carboxyl groups contribute to the development of resinous acid values which may be occupied, in substance, by the alicyclic carboxylic acid with low dissociation in a non-aqueous medium, thereby resulting in resinous product with weak acidity. Thus, the present objectives of producing a resin with improved curing properties and yet possessing the capablity of producing a film with excellent weather resistance cannot be attained. In order to attain the objective of the present invention, it is essential that in addition to modifying the polyester with a saturated alicyclic acid (for improving the weather resistance), the type of carboxyl groups contributing to the development of resinous acid value must be controlled and at least part of said groups should be composed of aromatic polycarboxylic acids which are believed to be effective for improving the gloss and curing properties. The present invention has been made on the basis of these findings.

SUMMARY OF THE INVENTION

According to the invention, there is provided a resinous composition for coating use, which comprises 60 to 90% by weight of a polyester resin and 40 to 10% by weight of an amino-form-aldehyde resin etherified with a monohydric alcohol having 1 to 4 carbon atoms.

The resinous composition used in the coating compositions of the present invention is comprised of 60 to 90% by weight of an acid controlled modified polyester resin and 40 to 10% by weight of an aminoformaldehyde resin etherified with a monohydric alcohol having 1 to 4 carbon atoms, said polyester resin being composed of (1) an alcohol component consisting of
  (A) 20 to 64% by weight of at least one diol selected from the group consisting of neopentyl glycol and hydroxy pivalic acid neopentyl glycol ester,
  (B) 14 to 34% by weight of a triol and
  (C) 0 to 66% by weight of other polyhydric alcohol than said (A) and (B), and
(2) an acid component consisting of
  (D) a mole % of saturated alicyclic polycarboxylic acid,
  (E) b mole % of polycarboxylic acid which will give, at a state capable of developing resinous acid value, a titration midpoint potential in non-aqueous potentiometric titration of more than −350 mV, and
  (F) c mole % of at least one acid selected from the group consisting of polycarboxylic acids other than said (D) and (E), and monocarboxylic acid, wherein a is 10 to 80 and b+c is 90 to 20, 10 to 100 mole % of the carboxyl groups capable of developing resinous acid value of the polyester resin being derived from said (E) acid.

In the present specification and claims, the term "at the state capable of developing resinous acid value" shall mean a "carboxylic acid incorporated in a polyester resin as the sole acid component, whose carboxyl group still remains in a free form and is capable of developing a resinous acid value", and the term "carboxyl groups contributive to the development of acid value" means "carboxyl groups remaining in the final resin in free form which contribute to the development of the acid value of the polyester resin". The term "polyester resin" shall include both oil-free polyester and alkyd resins, and the term "titration midpoint potential" has the meaning stated by Douglas B. Bruss etal in Anal. Chem. 29, 232-235 (1957). Incidentally, in the instant specification, the term "acid controlled, modified" means the polyester resin, defined by the percent of carboxyl groups which contributes to the deveopment of the resinous acid value derived from the particular acid and the defined % of the total acid component occupied by the particular acid.

PREFERRED EMBODIMENTS OF THE INVENTION

Preferred embodiments of the invention shall be explained hereinunder.

The acid controlled modified polyeser resin used in the present invention is characterized by a particular combination of acid components consisting of (A) the a mole % of the hexahydrophthalic acid and anhydride thereof, (B) the b mole % of polycarboxylic acid whose titration midpoint potential in the non-aqueous potentiometric titration, at the state of being capable of developing a resinous acid value, is more than $-350$ mV, and (C) the c mole % of the other poly and/or mono carboxylic acid, wherein $$a + b + c = 1.0 \text{ mole}$$
$$10 \leq \frac{a}{a+b+c} \times 100 \leq 80 \text{ mole \%}$$
$$0 \leq c \text{ mole}$$

Such polyester resin may be, as stated in Japanese patent application No. 154209/82, filed on Sept. 3, 1982 by the same applicant, preferably and advantageously prepared by the combination steps of reacting an acid mixture of (a) mole of (A) acid, ($b-b_1$) mole of (B) acid, and (C) mole of (C) acid, with a polyhydric alcohol to obtain a polyester prepolymer havng a resinous acid value of M, in which $$M = N\left(1 - \frac{x}{100}\right)$$

and subjecting thus obtained prepolymer to an esterification with a $b_1$ mole of (B) acid, thereby obtaining a resinous product having an acid value of N.

In the abovesaid statement, $b_1$ is equal to or less than the b mole and denotes the amounts of (B) to be charged in a later stage and determined by the following equation:

$$b_1 = \frac{\frac{x}{100} \times N \times W}{56,100} \times \frac{1}{f} \times \frac{1}{1 - \frac{P}{100}}$$

wherein N stands for the resinous acid value of the final product (mg of KOH required for the neutralization of 1 g of resinous solid matter); W is the weight of the polyester resin; f is the number of functional groups possessed by (B); P is the reaction percentage (%) of (B) at the later charging stage; x is the mole % of (B) to be incorporated as carboxylic groups capable of exhibiting a resinous acid value and determined in a range of $$10 \leq x \leq 100$$

Briefly speaking, said method is characterized, in that the preparation of the acid controlled modified polyester resin, by first introducing a less reactive alicyclic acid ester into the polyester chain, following esterification with an amount of a later charged polycarboxylic acid (B) which has a considerably strong acidity, thereby obtaining a polyester in which the particular % of the carboxyl groups capable of exhibiting the resinous acid value are occupied by those of said (B) acid.

Examples of polycarboxylic acids showing the titration midpoint potential of more than $-350$ mV at the stage of being capable of developing resinous acid values may include aromatic polycarboxylic acids as phthalic anhydride, isophthalic acid, terephthalic acid, trimellitic anhydride, pyromellitic anhydride and the like. Such polycarboxylic acid per se will, in general, will exhibit when an electric potential-TBAH titer curve is formed from the test results of a non-aqueous potentiometric titration, a curve having multi-stage inflection points, and however, when incorporated in polyester chain. When, however, at least one of the carboxyl groups remain in a free state the corresponding curve will exhibit a diminished number of inflection points, accordingly.

At the stage of being incorporated in the polyester chain, if a polycarboxylic acid is possessed of such acid strength that the aforesaid titration midpoint potential is more than $-350$ mV, then such a member may advantageously be used for the object of the present invention.

As the acid components, other poly-and/or monocarboxylic acids may be present, if desired.

Such acids may be any of the members customarily used as the acid component of polyester rein, including aliphatic or partially saturated alicyclic acids like succinic acid and its anhydride, adipid acid, azelaic acid, sebacic acid, tetrahydrophthalic anhydride, maleic anhydride, fumaric acid, itaconic acid and the like. Furthermore, monocarboxylic acids such as benzoic acid, p-t-butyl benzoic acid and the like may be added for the purpose of regulating the molecular weight of the resin.

The polyhydric alcohol component to be reacted with said acid mixture is composed of a diol selected from neopentyl glycol and hydroxy pivalic acid neopentyl glycol ester, a triol such as trimethylol propane and trimethylol ethane, and an optional polyhydric alcohol other than said diols and triols. Examples of such optional polyhydric alcohols are alcohols selected from the group consisting of ethylene glycol, diethylene glycol, propylene glycol, 1,2-butylene glycol, 1,3-butylene glycol 2,3-butylene glycol, 1,4-butylene glycol, 1,6-hexane diol, 1,5-pentane diol, 2,5-hexane diol, glycerine, pentaerythritol, diglycerine, sorbitol, and 1,4-cyclohexane dimethanol.

One or more than two of said members may satisfactorily be used. As already stated, in said acid controlled modified polyester resin, 10-80 mole % of the total acid components should be occupied by said hexahydrophthalic acid or anhydride thereof (A) and moreover, 10-100 mole % of the carboxyl groups which develop a resinous acid value must be derived from the aforesaid polycarboxylic acid (B). Such acid control is essential. This is because, if the content of the hexahydrophthalic acid or anhydride thereof is less than 10 mole % of the total acid components, there is a tendency for the weather resistance not be improved, whereas if it exceeds the upper limit of 80 mole %, the chemical resistance be lowered. As the ratio of carboxylic groups responsible for the development of the resinous acid value, if the amount of said polycarboxylic acid having the specified acid strength is less than 10 mole %, then there is a general trend towards imparting insufficient gloss and curing properties and hence, the object of the present invention cannot be attained. In the actual preparation of the present acid controlled modified polyester resin, a polyester prepolymer is first prepared from an acid mixture of the (A) acid, the (C) acid (polycarboxylic and/or monocarboxylic acid) and, if desired, part of the (B) acid, and the polyhydric alcohol component, then the total amount or the remaining amounts of the (B) acid are added in later stage and esterification is continued to obtain the acid controlled modified polyester resin.

The amounts of polycarboxylic acid (B) used in the first step and in the second step reactions may be varied with the number of functional groups (f) in the polycarboxylic acid (B), the resinous acid value (N), the resin weight (W), the desired mole % (x) of carboxyl groups derived from said polycarboxylic acid (B) in the total carboxyl groups capable of developing a resinous acid value and the reaction rate (P) of the polycarboxylic acid (B) to be charged in the later stage. They are, however, determined as follows: That is, the amount of (B) to be charged in later stage ($b_1$ mole) is first determined by the aforesaid equation, and the amount of (B) to be used in the first step is then determined as the difference between the designated b mole and said $b_1$ mole. Incidentally, the reaction percentage % (P) of the polycarboxylic acid (B) to be charged in a later stage refers to the percentage of carboxyl groups in (B) added in later stage are to be reacted to ensure that the polycarboxylic acid is definitely incorporated into the polyester chain by esterification. This value is, for example, more than 50% in the case of a dicarboxylic acid, such as phthalic anhydride, and more that about 34% in the case of a tricarboxylic acid, such as trimellitic acid.

The esterification reaction between the polycarboxylic acid and the polyhydric alcohol may be carried out in a conventional way and no particular operational procedures are required. In a preferred embodiment, the reaction in the first step for obtaining the polyester prepolymer may be continued to a resinous acid value of 1-135, and the second step reaction to an acid value of 1-150. In regard to the number average molecular weight of the resin, it may satisfactorily be selected in a molecular weight range of the conventional polyester resins for coating use. In this way, there is provided an acid controlled modified polyester resin, 10 to 80 mole % of a the acid component being composed of saturated alicyclic polycarboxylic acid and 10 to 100 mole % of the carboxyl groups exhibiting an resinous acid value being derived from the polycarboxylic acid (B), whose titration midpoint potential in a non-aqueous potentiometric titration at the stage of being capable of developing resinous acid value, is more than $-350$ mV.

In the present invention, the abovesaid acid controlled modified polyester resin is used together with an aminoformaldehyde resin etherified with a monohydric alcohol having 1 to 4 carbon atoms, as, for example, a melamine resin, a guanamine resin, a urea resin and the like. The compounding ratio of these acid-controlled modified polyester resins and amino resin may be, in general, freely selected, in terms of solid weight ratio, to be in a range of 60 to 90% by weight of the former and 40 to 10% by weight of the latter. The most preferable range, however, is 70 to 80% by weight of the former and 30 to 20% by weight of the latter.

Thus, the present composition has the characteristics of an oil-free polyester coating composition, i.e. it possesses excellent weather resistance, interlaminar adhesion, mechanical properties of the coating and the like. Moreover, since the carboxyl groups capable of developing a resinous acid value of for the modified polyester resin are controlled in kind and the curing reaction with an amino resin proceeds quite smoothly because of the strong acidity, the composition exhibits improved curing properties and hence is very useful as a top coat for automobile bodies and the like.

The invention shall be now more fully explained in the following Examples. Unless otherwise being stated, all part and % are by weight.

EXAMPLE 1

Preparation of resinous composition containing acid controlled modified polyester resin, wherein 50 mole % of acid component is hexahydrophthalic anhydride and 75 mole % of the carboxyl groups capable of exhibiting resinous acid value of 8 are derived from isophthalic acid. Composition of acid controlled modified polyester resin A:

| | |
|---|---|
| hexahydrophthalic anhydride | 77.4 parts (0.5 mole) |
| isophthalic acid | 66.48 parts (0.4 mole) |
| adipic acid | 14.62 parts (0.1 mole) |
| trimethylolpropane | 25.61 parts |
| neopentylglycol | 52.67 parts |
| 1,6-hexanediol | 55.40 parts |
| | 292.18 parts |

Calculation of isophthalic acid to be charged in later stage:
  Designed resin
    resinous acid value $N = 8.0$
    polyester resin weight $W = 259.3$
    number of functional groups in isophthalic acid $f = 2$
    reaction percentage of later charged isophthalic acid $P = 90\%$
    mole % of carboxyl groups derived from isophthalic acid in the total carboxyl groups capable of developing resinous acid value $x = 75$
  Using the abovesaid equation with this data $b_1 = 0.139$ mole (23.05 parts) was obtained.

Into a reaction tank equipped with a heating device, a stirrer, a reflux condenser, a water separator, a fractional tower and a thermometer, were placed the abovesaid six materials and the mixture was heated. At this time, isophthalic acid was used in an amount of 43.43 parts (66.48−23.05=43.43 parts). At the stage when the materials were fused out, stirring was started and heating was continued until the tank temperature reached 230° C. However, from 160° C. to 230° C., the temperature was raised at a constant rate in 3 hours. The formed condensation water was distilled out of the system. When the temperature reached to 230° C., the tank mixture was maintained at the same temperature for 1 hour and then 5 parts of xylene (refluxing solvent) were gradually added and a condensation reaction was further continued in the presence of said solvent. The reaction was stopped at the stage when the resinous acid value reached 2.0 calculated by the equation:

$$M = 8.0\left(1 - \frac{75}{100}\right)$$

and the tank was allowed to cool to 100° C. to obtain a polyester prepolymer A-I. Next, 23.05 parts (0.139 mole) of isophthalic acid were placed in the tank and the tank temperature was raised to 210° C. At this time, from 190° C. to 210° C., said temperature was raised at a constant speed in 1 hour and the this condensation water formed was distilled out of the system. When the tank temperature reached 210° C., the tank was maintained at this temperature to continue the reaction. The said reaction was stopped at the stage when the resinous acid value reached 8.0 and the reaction mixture was allowed to cool. After cooling, 106.1 parts of xylene were added to obtain an acid controlled modified polyester resin solution A, the carboxyl groups capable of developing the resinous value for said resin being controlled in kind. This solution A had a non-volatile content of 70.1%, a varnish viscosity (Gardner viscosity, 25° C.) of $Z_1$, and a resinous acid value of 8.1.

Figure 1:
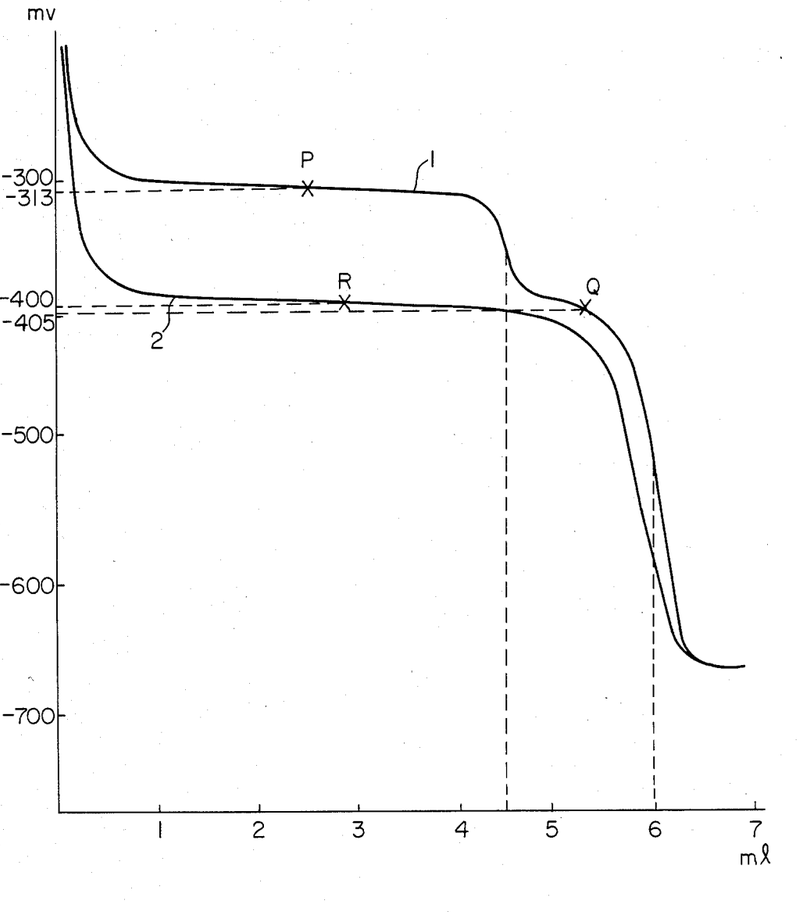
FIG. 1 shows a non-aqueous potentiometric titration curve of a polyester prepolymer A-1 (2) and of an acid controlled modified polyester resinous solution A (1) obtained in Example 1, wherein the ordinate axis indicates the electric potential and the transverse axis the titer measured by using an n-tetrabutyl ammonium hydroxide as a titration reagent.

Using pyridine solutions of the thus obtained polyester prepolymer A-I and of the acid controlled modified polyester resin solution A, non-aqueous potentiometric titration was carried out with a titration reagent of n-tetrabutyl ammonium hydroxide (TBAH) and the titration curves were shown in FIG. 1.

As clearly known from the drawing, the titration midpoint potential (R) of polyester prepolymer A-1 (2) is −400 mV which agrees with the the titration midpoint potential of polyester resin derived from an acid component of hexahydrophthalic anhydride alone as shown in Table 1. It was thus confirmed that the carboxyl groups, in which the resinous acid value of the 2.0 of polyester prepolymer A-1 was developed, were all derived from the hexahydrophthalic anhydride used.

However, in the titration curve (1) of acid controlled modified polyester resin solution (A), there are 2 inflection points and the titration midpoint potentials (P.Q) are −313 mV and −405 mV, respectively, which are well in accord with the titration midpoint potentials of −310 mV and −400 mV for the polyester resins whose acid components are isophthalic acid alone and hexahydrophthalic anhydride alone as shown in Table 1. Therefore, the carboxyl groups which contribute to the development of the resinous acid value 8.1 of the acid controlled modified polyester resin solution A, are derived from both isophthalic acid and hexahydrophthalic anhydride, the equivalent ratio of these acids being 75/25. Thus, it was confirmed that the type of carboxyl groups capable of developing the resinous acid value were surely controlled as indicated under the passage "designed resin" by x=75%.

TABLE 1

Titration midpoint potentials for various carboxylic acids at the stage capable of developing a resinous acid value

| | electric potential (mV) |
|---|---|
| HHPA | −400 |
| AdA | −390 |
| sebacic acid | −420 |
| PAn | −290 |
| IPHA | −310 |
| TMAn | −240 |

HHPA ... hexahydrophthalic anhydride
AdA ... adipic acid
PAn ... phthalic anhydride
IPHA ... isophthalic acid
TMAn ... trimellitic anhydride

EXAMPLES 2 TO 5

Based on the resinous compositions shown in Table 2, acid controlled modified polyester resin solutions B to E were prepared according to the procedures of Example 1. The characteristic values of these varnishes are shown in Table 2.

EXAMPLES 6 to 7

Based on the resinous compositions given in Table 2, modified polyester resin solutions F and G (whose resins were not acid controlled) were prepared by a conventional polyesterification, for comparison's sake. The characteristic values of these varnishes are also shown in Table 2.

TABLE 2

| Example No. | 1 | 2 | 3 | 4 | 5 | 6 | 7 |
|---|---|---|---|---|---|---|---|
| resinous solution | A | B | C | D | E | F | G |
| composition of polyester prepolymer | | | | | | | |
| hexahydrophthalic anhydride | 77.4 (0.5) | 71.98 (0.465) | 75.85 (0.490) | 30.96 (0.2) | 96.44 (0.623) | 77.4 (0.5) | 108.36 (0.7) |
| isophthalic acid | 43.43 (0.261) | 66.48 (0.4) | 66.48 (0.4) | 63.48 (0.382) | | 66.48 (0.4) | |
| adipic acid | 14.62 (0.1) | 14.62 (0.1) | 14.62 (0.1) | 14.62 (0.1) | 49.86 (0.3) | 14.62 (0.1) | 49.86 (0.3) |
| trimethylolpropane | 25.61 | 25.61 | 25.61 | 25.17 | 46.70 | 25.61 | 46.70 |
| neopentylglycol | 52.67 | 52.67 | 52.67 | 70.32 | 30.82 | 52.67 | 30.82 |
| 1,6-hexanediol | 55.40 | 55.40 | 55.40 | 60.90 | 64.83 | 55.40 | 64.83 |
| composition of later charging polycarboxylic acid (B) | | | | | | | |
| phthalic anhydride | | 5.19 (0.035) | | | 11.44 (0.077) | | |
| isophthalic acid | 23.05 | | | 52.86 | | | |

TABLE 2-continued

| Example No. | 1 | 2 | 3 | 4 | 5 | 6 | 7 |
|---|---|---|---|---|---|---|---|
| resinous solution | A | B | C | D | E | F | G |
| | (0.139) | | | (0.318) | | | |
| trimellitic anhydride | | | 1.97 | | | | |
| | | | (0.010) | | | | |
| designed resin | | | | | | | |
| weight W of polyester resin | 259.30 | 259.07 | 259.72 | 254.88 | 259.27 | 259.30 | 259.75 |
| resinous acid value N | 8.0 | 8.0 | 8.0 | 8.0 | 20.0 | 8.0 | 20.0 |
| number of functional groups in later charging (B) f | 2 | 2 | 3 | 2 | 2 | | |
| reaction % P of said (B) | 90 | 60 | 40 | 95 | 70 | | |
| mole % of (B) in carboxyl groups developing resinous acid value x | 75 | 75 | 50 | 87.5 | 50 | | |
| characteristic value of varnish | | | | | | | |
| varnish viscosity | $Z_1$ | $Z-Z_1$ | $Z_2-Z_3$ | $Z_3$ | Y | $Z-Z_1$ | Y-Z |
| final resinous acid value | 8.1 | 7.8 | 8.2 | 7.9 | 19.8 | 8.3 | 19.6 |
| non-volatile content (%) | 70.1 | 69.6 | 70.5 | 70.0 | 70.3 | 69.6 | 70.3 |

( ) indicates moles

EXAMPLE 8

Using the acid controlled modified polyester resin solution A obtained in the aforesaid Example 1 and following the prescriptions as given in Table 3, 4 and 5, dispersion pastes of White, Red ion oxide, Cyanine blue and Anthraquinone Red colors were prepared.

TABLE 3

| formulation of White colored dispersion | |
|---|---|
| titanium white (Note 2) | 60 parts |
| acid controlled modified polyester resin solution A | 25 |
| Solvesso 100 (Note 3) | 15 |
| dispersing agent (Note 4) | 0.05 |
| | 100.05 |

TABLE 4

| formulation of Red ion oxide dispersion | |
|---|---|
| red ion oxide (Note 5) | 50 parts |
| acid controlled modified polyester resin solution A | 30 |
| Solvesso 100 | 20 |
| dispersing agent | 0.05 |
| | 100.05 |

TABLE 5

| formulation of cyanine blue dispersion | |
|---|---|
| cyanine blue (Note 6) | 20 |
| acid controlled modified polyester resin solution A | 56 |
| Solvesso 100 | 30 |
| dispersing agent | 0.05 |
| | 100.05 |

TABLE 6

| formulation of anthraquinone red dispersion | |
|---|---|
| anthraquinone red (Note 7) | 16 |
| acid controlled modified polyester resin solution A | 34 |
| Solvesso 100 | 50 |
| dispersing agent | 0.05 |

TABLE 6-continued

| formulation of anthraquinone red dispersion | |
|---|---|
| | 100.05 |

Note 2 ... titanium R 5N manufactured by Sakai Chem. Co.
Note 3 ... mixed solvent manufactured by Esso Standard Petroleum Co.
Note 4 ... KF-69 10% solution, manufactured by Shinetsu Silicon K.K.
Note 5 ... Tenyo Red Ion Oxide 501, manufactured by Tone Sangyo K.K.
Note 6 ... Fastgen Blue 700-3, manufactured by Dainippon Ink Co.
Note 7 ... Chromophthal Red A3B, manufactured by Ciba-Geigy White and Red colored coating compositions were then prepared with the above said dispersions and following the prescriptions given below.

TABLE 7

| formulation of white colored coating composition | |
|---|---|
| white dispersion paste | 100 parts |
| blue dispersion paste | 0.2 |
| acid controlled modified polyester resin solution A | 60 |
| melamine resin | 32.2 |
| n-butanol | 2 |
| triethylamine | 0.2 |
| surface conditioner (Note 8) | 0.4 |
| | 195.1 |

Note 8 ... Modaflow 50% solution Monsanto Chem. Co.

TABLE 8

| formulation of red colored coating composition | |
|---|---|
| red dispersion paste | 62 parts |
| red ion oxide dispersion paste | 35 |
| white dispersion paste | 3 |
| acid controlled modified polyester resin solution A | 115 |
| melamine resin | 57 |
| n-butanol | 5 |
| triethylamine | 0.5 |
| surface conditioner | 0.5 |
| | 278.0 |

Each of the abovesaid coating compositions was diluted with a mixed solvent consisting of 10 parts of toluene, 20 parts of Solvesso 100, 50 parts of Solvesso 150 (mixed solvent manufactured by Esso Standard Petroleum Co.) and 20 parts of butyl acetate to adjust the viscosity of 23 seconds/No. 4 Ford Cup (20° C.). And the respective composition was applied by spray coating onto spc-1 dull steel plates previously treated with zinc phosphate, subjected to cationic electrodeposition and then coated with an inter-coating composition, the coating was, after standing for a defined period of time, baked at 140° C. for 30 minutes.

The gel fraction, the weather resistance and the film performance properties of the thus obtained coating are shown in the following Table 9. (As to the gel fraction, measurement was also made with the coating baked at 120° C. for 30 minutes).

EXAMPLES 9 TO 12

Using the acid controlled modified polyester resin solutions B, C, D and E obtained in Examples 2 to 5 and following the prescriptions given in Tables 3 to 6, primary colored dispersion pastes were prepared, and then white and red colored coating compositions were prepared according to the prescriptions given in the above-said Tables 7 and 8, except B, C, D and E were used as the acid controlled modified polyester resin solution. These coating compositions were applied onto steel plates as in Example 8 and the gel fraction, the weather resistance and film performance test results were shown in Table 9.

EXAMPLES 13 to 14 (Comparative Examples)

Using the modified polyester resin solutions F and G obtained in Examples 6 and 7 and following the prescriptions shown in Tables 3 to 6, the respective primary colored dispersion paste was prepared, and then white and red colored coating compositions were prepared according to the prescriptions given in Tables 7 and 8, except B, C, D and E were used as the acid controlled modified polyester resin solutions. These coating compositions were then applied to steel plates as in EXAMPLE 8 and the gel fraction, weather resistance and film performance test results were shown in Table 9.

TABLE 9

| Example No. | 8 | | 9 | | 10 | | 11 | | 12 | | 13 | | 14 | |
|---|---|---|---|---|---|---|---|---|---|---|---|---|---|---|
| resin solution | A | | B | | C | | D | | E | | F | | G | |
| color | white | red | white | red | white | red | white | red | white | red | white | red | white | red |
| gel fraction (%) | | | | | | | | | | | | | | |
| baked at 120° C. | 88 | 87 | 90 | 91 | 91 | 90 | 91 | 91 | 92 | 92 | 80 | 79 | 78 | 79 |
| baked at 140° C. | 94 | 94 | 95 | 94 | 96 | 95 | 96 | 95 | 96 | 97 | 86 | 84 | 88 | 89 |
| finish. appearance (gloss,) (Note 10) | ○ | △ | ○ | △ | ○ | △ | ○ | △ | ○ | △ | ○ | △ | ○ | △ |
| 60° (mirror) gloss (Note 11) | 93 | 85 | 92 | 86 | 93 | 87 | 93 | 86 | 91 | 86 | 93 | 86 | 92 | 85 |
| pencil hardness | H | H | H | H | H | H | H | H | H | H | FH | FH | FH | FH |
| impact strength (cm) DuPont type Φ = ½" 500 g | 35 | 35 | 30 | 35 | 35 | 35 | 35 | 35 | 35 | 35 | 35 | 30 | 35 | 35 |
| acid resistance (Note 12) | good | good | good | good | good | good | good | good | good | good | some dis colored | good | some dis colored | good |
| alkali resistance (Note 13) | good | good | good | good | good | good | good | good | good | good | discolor blister | some dis color | discolor blister | some dis color |
| interlaminar adhesion (Note 14) | 0/100 | 0/100 | 0/100 | 0/100 | 0/100 | 0/100 | 0/100 | 0/100 | 0/100 | 0/100 | 0/100 | 0/100 | 0/100 | 0/100 |
| accelerated weather resistance | | | | | | | | | | | | | | |
| QUV 300H 60° gloss retention | 86 | 88 | 88 | 85 | 87 | 86 | 87 | 86 | 86 | 83 | 77 | 78 | 82 | 78 |
| QUV 600H 60° gloss retention | 78 | 81 | 82 | 75 | 78 | 79 | 79 | 80 | 79 | 76 | 71 | 69 | 75 | 73 |
| outdoor exposure at Okinawa 60° gloss after 18 months | 83 | 76 | 82 | 77 | 84 | 80 | 83 | 82 | 83 | 80 | 76 | 72 | 76 | 70 |
| waxing resistance after 18 months | — | ○ | — | ○ | — | ○ | — | ○ | — | ○ | — | ○ | — | ○ |

TABLE 9-continued

| Example No. resin solution | 8 A | 9 B | 10 C | 11 D | 12 E | 13 F | 14 G |
|---|---|---|---|---|---|---|---|
| color | white | white | white | white | white | white | white |
|  | red | red | red | red | red | red | red |

(Note 15)

Test method:

Note 9:

Gel fraction ... Sample specimen of a baked coating was subjected to solvent extraction with acetone/methanol = 1/1 (weight), using a Soxhlet-extractor, at 70° C. for 5 hours, and the extract was dried at 120° C. for 30 minutes in a drier, and then cooled in a dessicator. The extract was weighed and the gel fraction was calculated from the said result.

Note 10:

Finishing appearance was evaluated by visual observation of gloss and on the basis of the following criteria:
⊚ ... very good
○ ... good
Δ ... slightly inferior
x ... no good Note 11:

60° (mirror) gloss 60° reflectance was measured by using a Murakami type glossmeter GM-3M Note 12:

Acid resistance 5 ml of N/10 H$_2$SO$_4$ was dropped in a glass cylinder (inner diameter of 38 mm, height of 15 mm) placed on the coating. After leaving it to stand for 24 hours at 20° C., the coating was washed with water and any occurrence of wrinkles, blisters and color changes were observed.

Note 13:

Alkali resistance 5 ml of N/10 NaOH was dropped in a glass cylinder as used in said Note 12, and after leaving to stand in a drier (55° C.) for 4 hours and subsequently washing with water, and occurrence of wrinkles, blisters and color changes were observed.

Note 14:

Interlaminar adhesion Onto a substrate, the coating composition obtained in each of the Examples was applied and baked at 160° C. for 30 minutes. Thereafter, the same coating composition was spray-coated as a top coat and baked at 140° C. for 30 minutes (2 coats with the same coating composition). Thereafter, cross-cuts with 2 mm width cut were made with a razor and a peel test was performed with a cellophane tape. The result was evaluated by the number of peeled out coatingsin a 2 cm square each.

Note 15 Waxing resistance:

A small quantity of car wax (Soft 99 semi-kneaded type manufactured by Nitto Chem. Co.) was taken on a white linen and rubbed against the coating intensely with the forefinger 10 times back and forth over a distance of 10 cm. An excess amount of wax remained on the coating was wiped out with a fresh linen cloth and the coating surface was visually observed. The result was evaluated from the extent of gloss down, abrasions and coloring to the white linen cloth.

○ ... no gloss down and abrasions on the coating, and no coloring to white linen
Δ ... slight gloss down and abrasions, and some coloring to white linen
x ... considerable gloss down and abrasions, and marked coloring to white linen

EXAMPLES 15 TO 17

Acid controlled modified polyester resin solutions H, I and J were prepared as in Example 1, following the prescriptions given in Table 10. The characteristic values of these varnishes are shown in Table 10.

EXAMPLES 18 TO 19

Using the acid controlled modified polyester resin solutions H and I and following the prescriptions given in Tables 3 to 6 of Example 8, the respective primary colored dispersion pastes were prepared, and thereafter, following the formulations shown in Tables 7 and 8, except for using H and I as the acid controlled modified polyester resin solutions, white colored and red colored coating compositions were prepared. These compositions were then applied as in Example 1, and the test results (gel fraction, weather resistance and film performance) were summarized in Table 11.

EXAMPLE 20 (Comparative Example)

Using the modified polyester resin solution J obtained in Example 17 and following the prescriptions shown in Tables 3 to 6 of Example 8, the respective primary colored dispersion pastes were prepared and thereafter, following the paint compositions given in Tables 7 and 8 (except for using the modified polyester resin solution J in place of the acid controlled modified polyester resin solution), white colored and red colored coating compositions were prepared. These compositions were then applied as in Example 1 and the test results (gel fraction, weather resistance and film performance) were shown in Table 11.

The test methods used and evaluation standards are as shown previously.

TABLE 10

| Example No. | 15 | 16 | 17 |
|---|---|---|---|
| resin solution | H | I | J |
| coconut oil | 30.11 | 117.9 | 117.9 |
| DMCD | | | |
| DD-100 | | | |
| hexahydro phthalic anhydride | 46.44 (0.3) | 46.44 (0.3) | 46.44 (0.3) |
| isophthalic acid | 91.11 (0.55) | 83.1 (0.5) | 116.34 |
| trimethylol propane | 28.96 | 70.51 | 70.51 |
| neopentylglycol | 82.39 | 43.89 | 43.89 |
| 1,6-hexanediol | 17.50 | 9.08 | 9.08 |
| later charged isophthalic acid (B) | 25.23 (0.15) | 33.24 (0.2) | — |
| predetermined value for polyester | | | |
| resin weight W | 283.9 | 370.5 | 370.5 |
| resnous acid value N | 8.0 | 8.0 | 8.0 |
| later charged (B) number of functional groups f | 2 | 2 | |
| reaction % P | 90.0 | 90.0 | |
| B mole % occupied in carboxyl groups which develop resinous acid value x | 75 | 75 | |
| varnish characteristics | | | |
| viscosity | Y-Z | W-X | X |
| resinous acid value | 7.9 | 7.8 | 8.1 |
| non-volatile % | 70.2 | 70.5 | 70.2 |
| Gel fraction % | | | |
| baked at 120° C. | 88 | 88 | 78 |
| baked at 140° C. | 94 | 94 | 86 |

( ) indicates mole

TABLE 11

| Example No. | 18 | | 19 | | 20 | |
|---|---|---|---|---|---|---|
| resin solution | H | | I | | J | |
| color | white | red | white | red | white | red |
| gel fraction (%) | | | | | | |
| baked at 120° C. | 89 | 88 | 90 | 88 | 74 | 77 |
| baked at 140° C. (Note 9) | 95 | 96 | 94 | 95 | 86 | 86 |
| finish. appearance (gloss,) (Note 10) | ○ | Δ | ○ | Δ | ○ | Δ |
| 60° (mirror) gloss (Note 11) | 93 | 86 | 92 | 88 | 92 | 87 |
| pencil hardness | FH | FH | HB | HB | HB | HB |
| impact strength (cm) DuPont type Φ = ½" 500 g | 35 | 35 | 40 | 40 | 40 | 40 |
| acid resistance (Note 12) | good | good | good | good | ** | ** |
| alkali resistance (Note 13) | good | good | good | good | * | ** |
| interlaminar adhesion (Note 14) | 0/100 | 0/100 | 0/100 | 0/100 | 0/100 | 0/100 |
| accerlated weather resistance | | | | | | |
| QUV 300H 60° gloss retention | 86 | 85 | 84 | 84 | 72 | 70 |
| QUV 600H 60° gloss retention | 78 | 79 | 78 | 77 | 58 | 60 |
| outdoor exposure at Okinawa 60° gloss after 18 months | 84 | 82 | 82 | 80 | 69 | 66 |
| waxing resistance after 18 months (Note 15) | — | ○ | — | ○ | — | Δ |

*discolored, blister
**somewhat discolored

EXAMPLE 21

Into a reaction tank fitted with a heating device, a stirrer, a reflux condenser, a water separator, a fractional tower and a thermometer, were placed 77.4 parts of hexahydrophthalic anhydride, 22.6 parts of trimethylol ethane, 22.4 parts of hydroxy pivalic acid neopentyl glycol ester (HPN), 56.1 parts of neopentyl glycol, 23.9 parts of Cardura E-10 (trademark of Shell Chem. Co., glycidyl compound), and 0.1 part of dibutyl tin oxide, and the mixture was heated. At the stage when the charged materials were fused out, stirring was started and heating was continued until the tank temperature reached 230° C. However, from 180° C. to 230° C., the temperature was raised at a constant rate in 3 hours.

While removing the formed water out of the system, the tank mixture was reacted at 230° C. until the resinous acid value reached 2.0 and thereafter allowed to cool to 80° C. The mixture was then added with 55.4 parts of isophthalic acid and heated to 210° C. At this time, from 190° C. to 210° C., the temperature was raised at a constant rate in 2 hours.

The mixture was reacted, while removing the formed water, at 210° C. until the resinous acid value reached 10.0, allowed to cool and then diluted with 102 parts of xylene to obtain a resinous solution K having a nonvolatile content of 69.8% and a varnish viscosity (Gardner viscosity, 25° C.) of X-Y.

A non-aqueous potentiometric titration was carried out by using pyridine as a solvent and n-tetra butyl ammonium hydroxide (methanol/benzene=1/10 solution) as a titration reagent and it was confirmed that there were 2 inflection points in the titration curve with the titration midpoint potentials of −300 mV and −400 mV.

They are well in accord with the titration midpoint potentials for the polyester resins whose acid components are isophthalic acid alone and hexahydrophthalic anhydride alone, respectively. From said analysis, it was also confirmed that 80 mole % of the carboxyl groups capable of developing resinous acid value were derived from isophthalic acid used.

EXAMPLE 22

27.7 parts of hexahydrophthalic anhydride, 19.8 parts of isophthalic acid, 11.0 parts of trimethylol ethane, 8.2 parts of HPN, 20.6 parts of neopentyl glycol, 9.3 parts of Cardura E-10 and 0.02 part of dibutyl tin oxide were reacted as in Example 15. After cooling to 80° C., 1.7 parts of phthalic acid were added and the mixture was reacted at 150° C. for 1 hour and then diluted with 30 parts of xylene to obtain a resinous solution L having a nonvolatile content of 75.1, a viscosity (Gardner viscosity, 25° C.) of X-Y.

From the non-aqueous potentiometric titration analysis showing the titration midpoint potential of −290 mV, it was confirmed that 80 mole % of the carboxyl groups capable of developing resinous acid value were derived from phthalic anhydride in the formed resin.

EXAMPLES 23 AND 24

Using the polyester resin solutions K and L obtained in Examples 21 and 22, and following the prescriptions shown below, clear coating compositions were prepared.

TABLE 12

| Formulation of clear coating composition | |
|---|---|
| polyester resin solution (on solid basis) | 70 parts |
| U-van 128 (butylated melamine, trade mark of Mitsui Tohatsu) (on solid basis) | 30 parts |
| | 100 parts |

Thus obtained compositions each was applied by using a doctor blade, on a polypropylene plate in 4 mil thickness. The coated plates were then baked at 140° C. or 100° C. in hot air drier, for 30 minutes and after cooling, the formed films were peeled out of the plates and gel fraction of the respect film was evaluated as in Example 8. The test results are shown in Table 13.

TABLE 13

| Gel fraction % | | |
|---|---|---|
| Example | 23 | 24 |
| polyester resin solution | K | L |
| baking temperature °C. | | |
| 100 | 60 | 68 |
| 120 | 80 | 85 |
| 140 | 94 | 95 |
| low temp. curing property judged from the Gel fraction % | ◯ | ◯ |

EXAMPLES 25 AND 26

Using the polyester resin solutions K and L and following the prescription shown below, white colored dispersion pastes were prepared.

TABLE 14

| Formulation of white colored dispersion paste | |
|---|---|
| polyester resin solution (on solid basis) | 59.5 parts |
| melamine resin (on solid basis) | 19.4 |
| titanium white (Note 1) | 60.0 |
| triethylamine | 0.2 |

(Note 1: titanium R5N manufactured by Sakai Chem. Co.)
Each of the abovesaid dispersion paste was diluted with a mixed solvent of 10 parts of toluene, 20 parts of Solvesso 100 (trademark of Esso Standard), 50 parts of Solvesso 150 (trademark of Esso Standard, mixed solvent) and 20 parts of butyl acetate to the viscosity of 23 seconds/No. 4 Ford Cup (20° C.).

The respective composition was applied onto a spc-1 dull steel plate previously treated with zinc phosphate, subjected to a cationic electrodeposition and then coated with an inter-coating composition, and thus formed coating was, after standing for a defined period of time, baked at 140° C. for 30 minutes. The film performance properties of thus obtained coatings were evaluated as in Example 8 and the test results were shown in Table 15.

TABLE 15

| Example No. | 25 | 26 |
|---|---|---|
| polyester resin solution | K | L |
| finishing appearance | ⊙ | ◯ |
| 60° (mirror) gloss | 96 | 92 |
| pencil hardness | H | H |
| acid resistance | good | good |
| alkali resistance | good | good |
| impact strength (cm) (DuPont type o = ½" 500 g) | 40 | 35 |
| interlaminar adhesion | 0/100 | 0/100 |
| accelerated weather resistance | | |
| QUV 300H 60° gloss retention | 88 | 84 |
| QUV 600H 60° gloss retention. | 78 | 73 |

Possibility of industrial use

As mentioned hereinabove, the present resinous composition can afford excellent coating, when used as a resinous vehicle in a clear or colored coating composition and possesses, in particular, good weather resistance, mechanical properties and interlaminar adhesion, and especially exhibits excellent curing properties. This makes the coating composition especially suitable as a top coat for automobile bodies and the like.

What is claimed is:

1. A resinous composition for a coating composition to be used as a top coat for automobile bodies, comprising 60 to 90% by weight of an acid controlled modified polyester resin and 40 to 10% by weight of an aminoformaldehyde resin etherified with a monohydric alcohol having 1 to 4 carbon atoms, said polyester resin being composed of
   (1) an alcohol component consisting of
      (A) 20 to 64% by weight of at least one diol selected from the group consisting of neopentyl glycol and hydroxy pivalic acid neopentyl glycol ester,
      (B) 14 to 34% by weight of a triol selected from the group consisting of trimethylol propane and trimethylol ethane and
      (C) 0 to 66% by weight of a polyhydric alcohol other than said (A) and (B), and
   (2) an acid component consisting of
      (D) a mole % of saturated alicyclic polycarboxylic acid,
      (E) b mole % of polycarboxylic acid which will give, at a state capable of developing a resinous acid value, a titration midpoint potential in nonaqueous potentiometric titration of more than $-350$ mV, and
      (F) c mole % of at least one acid selected from the group consisting of polycaroxylic acids other than said (D) and (E), and monocarboxylic acid, wherein a is 10 to 80 and b+c is 90 to 20, 10 to 100 mole % of the carboxyl groups capable of developing a resinous acid value for the polyester resin derived from said (E) acid.

2. A composition according to claim 1 where the other polyhydric alcohol (C) is selected from the group consisting of ethylene glycol, diethylene glycol, propylene glycol, 1,2-butylene glycol, 1,3-butylene glycol, 2,3-butylene glycol, 1,4-butylene glycol, 1,6-hexane diol, 1,5-pentane diol, 2,5-hexane diol, glycerine, pentaerythritol, diglycerine, sorbitol, and 1,4-cyclohexane dimethanol.

3. A composition according to claim 1 in which the diol (A) is neopentyl glycol.

4. A composition according to claim 1 in which the alcohol component consist of (A) neopentyl glycol, (B) trimethylol propane and (C) 1,6-hexane diol.

* * * * *